United States Patent [19]
Romer

[11] Patent Number: 6,047,858
[45] Date of Patent: Apr. 11, 2000

[54] PASTRY DOUGH OR CAKE DECORATING DEVICE

[76] Inventor: Arthur H. Romer, 1118 Orchard Way, Silver Spring, Md. 20904

[21] Appl. No.: 09/129,232

[22] Filed: Aug. 5, 1998

[51] Int. Cl.[7] .................................................. B67B 7/00
[52] U.S. Cl. .............................. 222/1; 222/326; 222/327; 222/387; 222/389
[58] Field of Search .................................... 222/326, 327, 222/387, 389

[56] References Cited

U.S. PATENT DOCUMENTS

| | | |
|---|---|---|
| D. 310,317 | 9/1990 | Broderick et al. . |
| D. 335,069 | 4/1993 | Capellan . |
| 2,767,885 | 10/1956 | Miller ........................................ 222/389 |
| 3,057,521 | 10/1962 | Ballard ....................................... 222/262 |
| 3,208,643 | 9/1965 | Phillips ...................................... 222/176 |
| 3,339,524 | 9/1967 | Benz . |
| 3,866,838 | 2/1975 | Miles ......................................... 239/372 |
| 3,921,858 | 11/1975 | Bemm ........................................ 222/389 |
| 4,838,457 | 6/1989 | Swahl et al. . |
| 4,844,917 | 7/1989 | DeLorimiere . |
| 4,961,517 | 10/1990 | Tkac . |
| 5,005,514 | 4/1991 | Verrico . |
| 5,223,245 | 6/1993 | Ibrahim et al. . |
| 5,370,734 | 12/1994 | Ferrero . |
| 5,505,775 | 4/1996 | Kitos . |

Primary Examiner—Henry J. Recla
Assistant Examiner—Timothy L. Maust
Attorney, Agent, or Firm—Jeffrey S. Melcher

[57] ABSTRACT

A device for applying frosting or icing to a cake or pastry from a cartridge containing pastry dough, frosting or icing. The device has a walled cartridge container and a hand-held gun for dispensing pastry dough, icing or frosting.

12 Claims, 6 Drawing Sheets

PASTRY DOUGH OR CAKE DECORATING DEVICE

FIELD OF THE INVENTION

The invention relates to a hand-held device for applying pastry dough, frosting or icing. The invention also relates to a method for applying pastry dough, frosting or icing.

BACKGROUND OF THE INVENTION

Decoration of cakes, pastries or the like foodstuffs with an attractive and tasty frosting or icing is a necessary and time consuming task. The preparation thereof frequently results in a significant mess, with spillage and clutter as a consequence of the required mixing containers, food coloring and flavoring bottles. This is especially true on a commercial level when it is desired to prepare frostings of varying colors for differing festive occasions as well as to provide frostings or trim icings of various flavors to complement the cake or pastry.

Frostings and icings having a high viscosity are usually applied using a baker's pastry bag, such as the ones disclosed in U.S. Pat. Nos. 4,961,517, 4,844,917, and Des. 310,317, or with a pastry gun as shown in U.S. Pat. No. Des. 335,069. The pastry bag and the pastry gun require significant force to squeeze the bag or trigger to force high viscosity frosting or icing through shaped nozzles and onto a cake or pastry. When used on a commercial level where numerous cakes and pastries must be coated with frosting and icing, the user's hands may become fatigues thus requiring the user to take rest breaks. Resting due to fatigue can undesirably raise the cost of preparing the cakes and pastries. Furthermore, fatigue can result in unwanted miss-application of the frosting or icing. Thus, there is a need for a device which applies high viscosity frostings and icings that does not require significant human force during application in order to avoid undesirable fatigue.

Forming pastry dough into shapes is similar to forming icing or frosting. Pastry bags have been used to form pastry dough into desired shapes. However, as with icing and frosting, when used on a commercial level where numerous pastries must be formed, fatigue can occur which requires significant amounts of resting. Resting due to fatigue can undesirably raise the cost of preparing the pastries. Therefore, a device which is capable of forming pastries without significant human force is desired.

SUMMARY OF THE INVENTION

An objective of the present invention is to provide a device for applying high viscosity frosting or icing to a pastry or cake which does not require significant human force.

Another objective of the present invention is to provide a device for applying high viscosity pastry dough which does not require significant human force.

The above objective and other objectives can be obtained by the following. Provided is a novel device for applying frosting or icing to a cake or pastry from a cartridge containing pastry dough, frosting or icing comprising:
  a walled cartridge container defining at least one internal chamber constructed and arranged to contain a cartridge and contain pressurized air, each internal chamber having an associated air inlet and an outlet;
  valve structure associated with each of the at least one air inlets for separately controlling air pressure applied to each of the at least one internal chambers whereby the air pressure can be varied in each individual internal chamber independent of one another;
  a hand-held gun for dispensing pastry dough, icing or frosting;
  an associated hose connecting each of the outlets to an associated gun valve in the hand-held gun; and
  a finger trigger on the hand-held gun connected to the gun valve where by when the finger trigger is activated the gun valve opens allowing the flow of pastry, icing or frosting through the hand-held gun.

Also provided is a novel device for applying frosting or icing to a cake or pastry comprising:
  a tube defining side walls of a compressed air chamber;
  a cap constructed and arranged to seal an end of the tube and define a top of the compressed air chamber;
  a plunger rod disposed within the tube;
  a sealing washer connected to the plunger rod and being constructed and arranged to provide an air seal with an inside surface of the tube and to slide along the inside surface, the sealing washer defining a lower wall of the compressed air chamber;
  an air inlet in the cap or the tube located to allow air into the compressed air chamber;
  valve structure associated with the air inlet for controlling the air pressure in the compressed air chamber;
  a container lid connected to a lower portion of the tube, the plunger rod extending through the container lid;
  a plunger connected on an end of the plunger rod on a side of the container lid opposite the tube;
  a container body having an opening that seals with the container lid and a container outlet in a portion opposite the opening;
  a hand-held gun for dispensing pastry dough, icing or frosting;
  a hose connecting the container outlet to a gun valve in the hand-held gun; and
  a finger trigger on the hand-held gun connected to the gun valve whereby when the finger trigger is activated the gun valve opens allowing the flow of pastry, icing or frosting through the hand-held gun.

The invention also provides a novel method of applying pastry dough, icing or frosting comprising:
  loading a cartridge containing pastry dough, icing or frosting into an inner chamber of a walled cartridge container defining at least one internal chamber constructed and arranged to contain the cartridge and contain pressurized air, each internal chamber having an associated air inlet and an outlet, a valve structure associated with each of the at least one air inlets for separately controlling air pressure applied to each of the at least one internal chambers, a hand-held gun for dispensing pastry dough, icing or frosting, an associated hose connecting each of the outlets to an associated gun valve in the hand-held gun, and a finger trigger on the hand-held gun connected to the gun valve whereby when the finger trigger is activated the gun valve opens allowing the flow of pastry, icing or frosting through the hand-held gun;
  adjusting the air pressure in the inner chamber containing the cartridge to a level sufficient to force the pastry dough, icing or frosting through an outlet in the cartridge, through the outlet in the inner chamber, though the hose and to the hand-held gun; and
  applying pressure to the finger trigger to cause flow of the pastry dough, icing or frosting through an outlet in the cartridge, through the outlet in the inner chamber, though the hose and through the hand-held gun.

The invention further provides a novel method of applying pastry dough, icing or frosting comprising:

loading pastry dough, icing or frosting into a container body of a device comprising:
a tube defining side walls of a compressed air chamber;
a cap constructed and arranged to seal an end of the tube and define a top of the compressed air chamber;
a plunger rod disposed within the tube;
a sealing washer connected to the plunger rod and being constructed and arranged to provide an air seal with an inside surface of the tube and slide along the inside surface, the sealing washer defining a lower wall of the compressed air chamber;
an air inlet in the cap or the tube located to allow air into the compressed air chamber;
valve structure associated with the air inlet for controlling the air pressure in the compressed air chamber;
a container lid connected to a lower portion of the tube, the plunger rod extending through the container lid;
a plunger connected on an end of the plunger rod on a side of the container lid opposite the tube;
the container body having an opening that seals with the container lid and a container outlet in a portion opposite the opening;
a hand-held gun for dispensing pastry dough, icing or frosting;
a hose connecting the container outlet to a gun valve in the hand-held gun; and
a finger trigger on the hand-held gun connected to the gun valve whereby when the finger trigger is activated the gun valve opens allowing the flow of pastry, icing or frosting through the hand-held gun;
connecting the container body to the container lid;
adjusting the air pressure in the compressed air chamber to a level sufficient to force the pastry dough, icing or frosting through the container outlet, though the hose and to the hand-held gun; and
applying pressure to the finger trigger to cause flow of the pastry dough, icing or frosting through the container outlet, through the hose and through the hand-held gun.

The invention also provides a novel method of applying pastry dough, icing or frosting comprising:

loading a cartridge containing pastry dough, icing or frosting into a container body of a device comprising:
a tube defining side walls of a compressed air chamber;
a cap constructed and arranged to seal an end of the tube and define a top of the compressed air chamber;
a plunger rod disposed within the tube;
a sealing washer connected to the plunger rod and being constructed and arranged to provide an air seal with an inside surface of the tube and slide along the inside surface, the sealing washer defining a lower wall of the compressed air chamber;
an air inlet in the cap or the tube located to allow air into the compressed air chamber;
valve structure associated with the air inlet for controlling the air pressure in the compressed air chamber;
a container lid connected to a lower portion of the tube, the plunger rod extending through the container lid;
a plunger connected on an end of the plunger rod on a side of the container lid opposite the tube;
the container body having an opening that seals with the container lid and a container outlet in a portion opposite the opening;
a hand-held gun for dispensing pastry dough, icing or frosting;
a hose connecting the container outlet to a gun valve in the hand-held gun; and
a finger trigger on the hand-held gun connected to the gun valve whereby when the finger trigger is activated the gun valve opens allowing the flow of pastry, icing or frosting through the hand-held gun;
connecting the container body to the container lid;
adjusting the air pressure in the compressed air chamber to a level sufficient to force the pastry dough, icing or frosting through the container outlet, though the hose and to the hand-held gun; and
applying pressure to the finger trigger to cause flow of the pastry dough, icing or frosting through the container outlet, through the hose and through the hand-held gun.

DETAILED DESCRIPTION OF PREFERRED EMBODIMENTS

Figure 1:
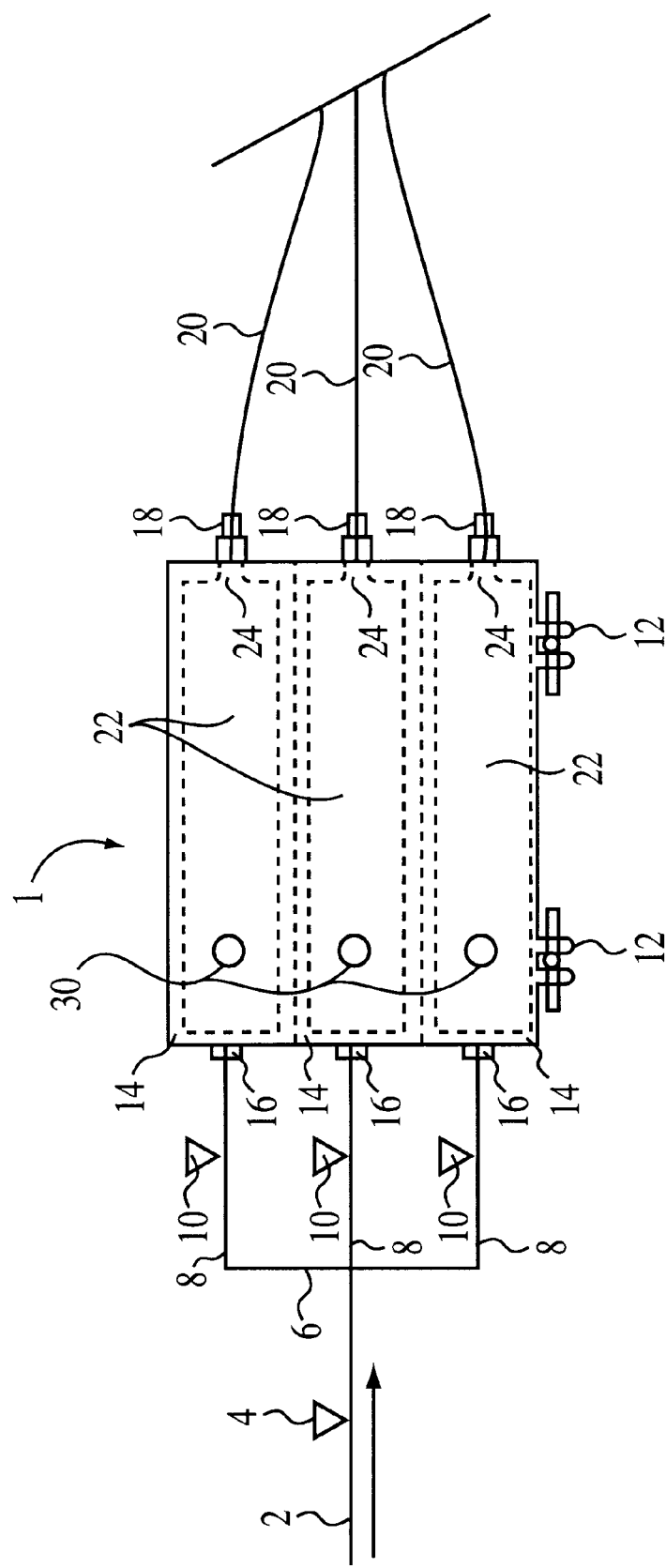
FIG. 1 illustrates a top view of the cartridge box according to the present invention.
Figure 2:
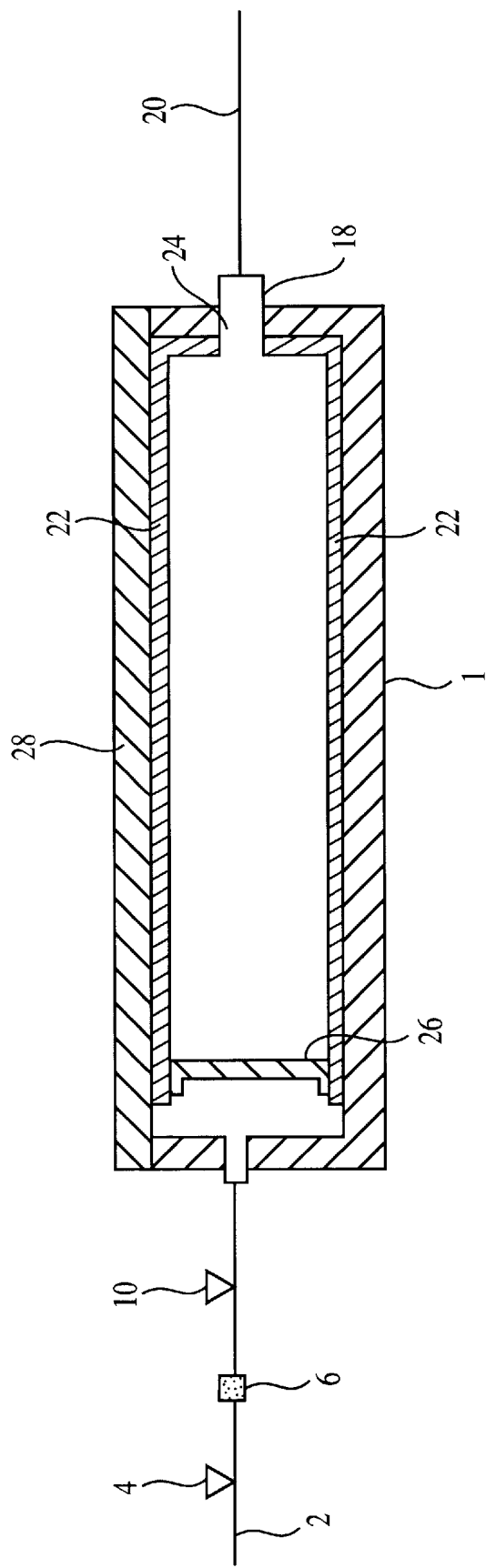
FIG. 2 illustrates a cross-sectional view of a side of the cartridge box according to the present invention.

The invention will now be described with reference to the attached Figures. FIGS. 1 and 2 illustrate a cartridge box 1 which houses three cartridges 22 that contain pastry dough, icing or frosting. A pressurized air hose 2 is connected to an air compressor (not shown). Any standard air compressor can be used. The air pressure in the air hose 2 is regulated using a conventional air pressure valve 4. A splitter 6 is used to divide the air pressure in the air hose 2 into three separate air conduits 8.

The cartridge box 1 is a walled structure defining three internal chambers shown at 14. Each internal chamber 14 has an associated air inlet 16, for supplying air under pressure to the internal chamber 14. Each air inlet 16 is connected to a separate air conduit 8. Each air conduit 8 has an associated standard air pressure valve 10 for controlling the air pressure supplied to each internal chamber 14 independently of the other internal chambers 14. The number of internal chambers 14 can be varied as desired. For example, the cartridge box can contain one internal chamber 14, or a plurality of internal chambers 14. Preferably, each internal chamber 14 has an associated air conduit 8 and air pressure valve 10 to adjust the air pressure within the internal chamber 14.

Each internal chamber 14 has an associated outlet 18 through which the pastry dough, icing or frosting passes. Each outlet 18 is connected to a hose 20. The internal chambers 14 are constructed and sized to contain a cartridge 22 containing, pastry dough, frosting or icing. The cartridge box 1 can be opened using the lid 28. The lid 28 can be secured using any suitable securing device, such as a hinge on one side and a locks 12 as shown in FIG. 1, or the lid 28 can slide into a grove on the body of the cartridge box 1 (not shown). If desired, screws, bolts, clamps, cam locks, and the like can be used to secure the lid 28 to the body of the cartridge box 1. While a top lid 28 has been described, the location of the lid 28 on the cartridge box 1 can be provided in any desired location, such as on a side of the cartridge box 1 and the air inlets 16 provided on the lid 28 (embodiment not shown).

FIG. 2 illustrates a cross-sectional view through the center of a cartridge 22. The cartridge 22 comprises a tubular walled structure having openings on opposite ends and a substantially constant inner diameter. On one end of the cartridge 22, a cartridge outlet 24 is provided. An inside surface defining the internal chamber 14 and the inside surface of the lid 28 are constructed such that a seal is provided around the outer surface of the cartridge 22 when the lid 28 is secured in place and/or when air pressure is applied to the internal chamber 14. This prevents air from traveling around the cartridge 22 inside of the internal chamber 14 and through the outlet 18, instead of applying pressure to the plunger 26. This seal to the outside surface of the cartridge 18 can be provided by shaping the inside surface of the lid 28 and the surface defining the internal chamber 14 to mate with the outside surface of the cartridge 22 and provide a seal upon contact to the outside surface of the cartridge 22. If desired, other means of sealing using the outside surface of the cartridge 22 can be utilized, such as gaskets. Alternatively, or in addition to sealing the outside of the cartridge 22 to the internal chamber 14 and lid 28, the cartridge outlet 24 and the outlet 18 can be constructed to provide a seal when the cartridge 22 is loaded into the internal chamber 14, to prevent air from traveling around the cartridge 22 inside of the internal chamber 14 and through the outlet 18, instead of applying pressure to the plunger 26. This can be accomplished, for example, by the use of materials which provide a seal without the use of gaskets or by using an o-ring, flat gasket or other suitable seal material. At the other end the cartridge 22, an opening is provided for accepting pastry dough, icing or frosting. Once the cartridge 22 is filled with the desired material, a plunger 26 is inserted into the cartridge 22. The cartridge 22 operates much like a calking tube. Once air pressure is applied to the plunger 26, the plunger 26 is forced further into the cartridge 22, which forces pastry dough, icing or frosting out of the cartridge 22.

The desired icing or frosting can be purchased prepackaged in cartridges 22. Alternatively, the desired pastry dough, icing or frosting can be formulated and then inserted in a cartridge 22, followed by inserting the plunder 26. In addition, the device can also be used to form pastry dough. The desired pastry dough can be purchased prepackaged in cartridges 22. Alternatively, the desired pastry dough can be formulated and then inserted in a cartridge 22, followed by inserting the plunder 26.

Figure 3:
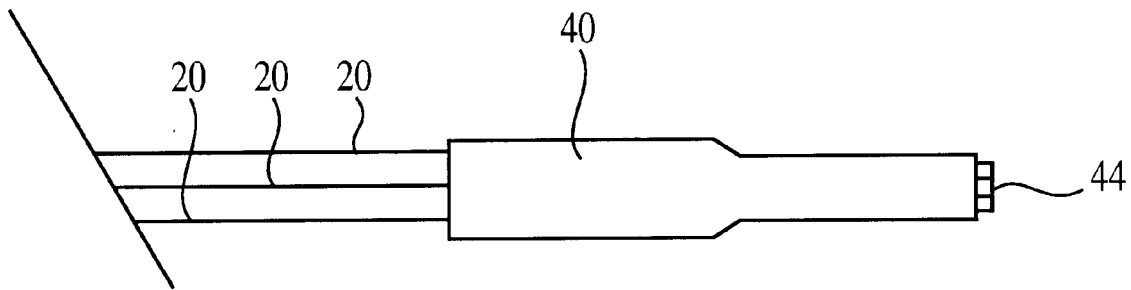
FIG. 3 illustrates a top view of the hand-held gun according to the present invention.
Figure 4:
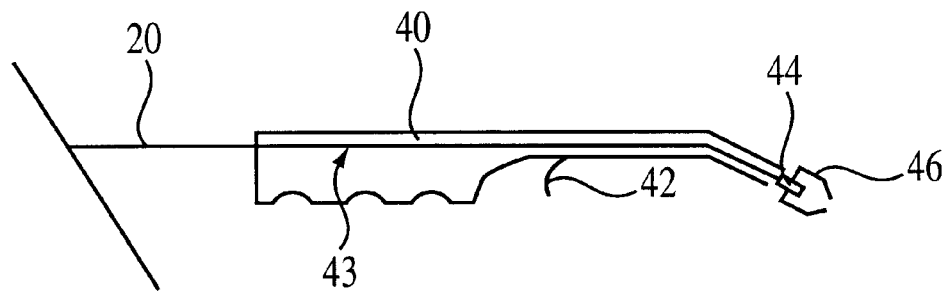
FIG. 4 illustrates a side view of the hand-held gun according to the present invention.

FIGS. 3 and 4 illustrate top and cross-sectional views of a hand-held gun 40 for controlling dispensing of the pastry dough, icing or frosting from the device. The hand-held gun 40 is connected to the three hoses 20 and each hose is connected to an associated gun valve 43 that is activated by the finger trigger 42. The finger trigger 42 opens the gun valves 43 and allows pastry dough, icing or frosting to flow therethrough. Preferably, the gun valves 43 are constructed such that the greater the amount the finger trigger 42 is pulled, the more the gun valves 43 open allowing more pastry dough, frosting or icing to flow therethrough. The gun valves 43 are each connected to an associated nozzle 44. The nozzles 44 are connected to an interchangeable head 46, through which the pastry dough, icing or frosting flows. The interchangeable head 46 can have a shaped opening to provide the desired shape of pastry dough, icing or frosting. The interchangeable head 46 works in the same manner as shaped heads on conventional pastry bags. Thus, one skilled in the art will easily be able to provide a shaped head 46 for the desire shape of pastry dough, icing or frosting.

The operation of the device will now be described. First, air pressure is relieved in the internal chambers 14 by closing the valves 10 and opening the valves present in the hand-held gun 40. Once the air pressure in the internal chambers 14 is relieved, the lid 28 is opened to provide access to the internal chambers 14. The desired cartridge(s) 22 is inserted in the internal chamber(s) 14 and the lid 28 is closed. Pressure is then applied to the internal chamber(s) 14 by opening the valve(s) 10. In general, the greater the air pressure against the plunger 26, the greater the speed at which the pastry dough, icing or frosting will travel out of the cartridge 22, through the hose 20, and out of the hand-held gun 40 when the trigger 42 is pulled. Therefore, by varying the amount of air pressure against the plunger 26 using the valve 10, the speed of the pastry dough, icing or frosting being applied can be varied. When a variable gun valve(s) 43 is utilized in the hand-held gun 40, the flow speed of the pastry dough, icing or frosting can also be adjusted by varying the amount the gun valve 43 is open or closed using the trigger 42. Furthermore, when multiple cartridges 22 are used, the pressure can be shut off and turned-on to each cartridge 22 independently to easily change between different types or combinations of pastry dough, icing or frosting being applied using the hand-held gun 40. For example, more than one type of frosting or icing can be applied simultaneously using the device by applying the desired amount of air pressure to more than one internal chamber 14. The air pressure can also be adjusted among the different cartridges 22 to compensate for differences in viscosity. Higher viscosity materials usually require a higher pressure to provide a desired level of speed through the hand-held gun 40. The device is suitable for applying high viscosity materials such as pastry dough, frosting and icing, which have a putty-like consistency and do not flow fast or cannot be sprayed like a liquid. Liquid materials, such as glazes and inks are generally unsuitable for use in the device described herein. Furthermore, such liquid materials require a spraying device which is very different from the device described herein.

To provide easy cleaning of the device, each internal chamber 14 can optionally be provided with an associated water inlet 30 for supplying water to the internal chamber 14. Each water inlet 30 should be provided with a back-flow valve or other shut-off valve to prevent air pressure from escaping the internal chamber 14. Each internal chamber 14 can be cleaned by supplying water to the internal chamber 14 through the inlet 30 and then opening the valve 10 and gun valve 43 to allow air to flow through the internal chamber 14 which will flush the water through the hose 20 and hand-held gun 40.

Figure 5:
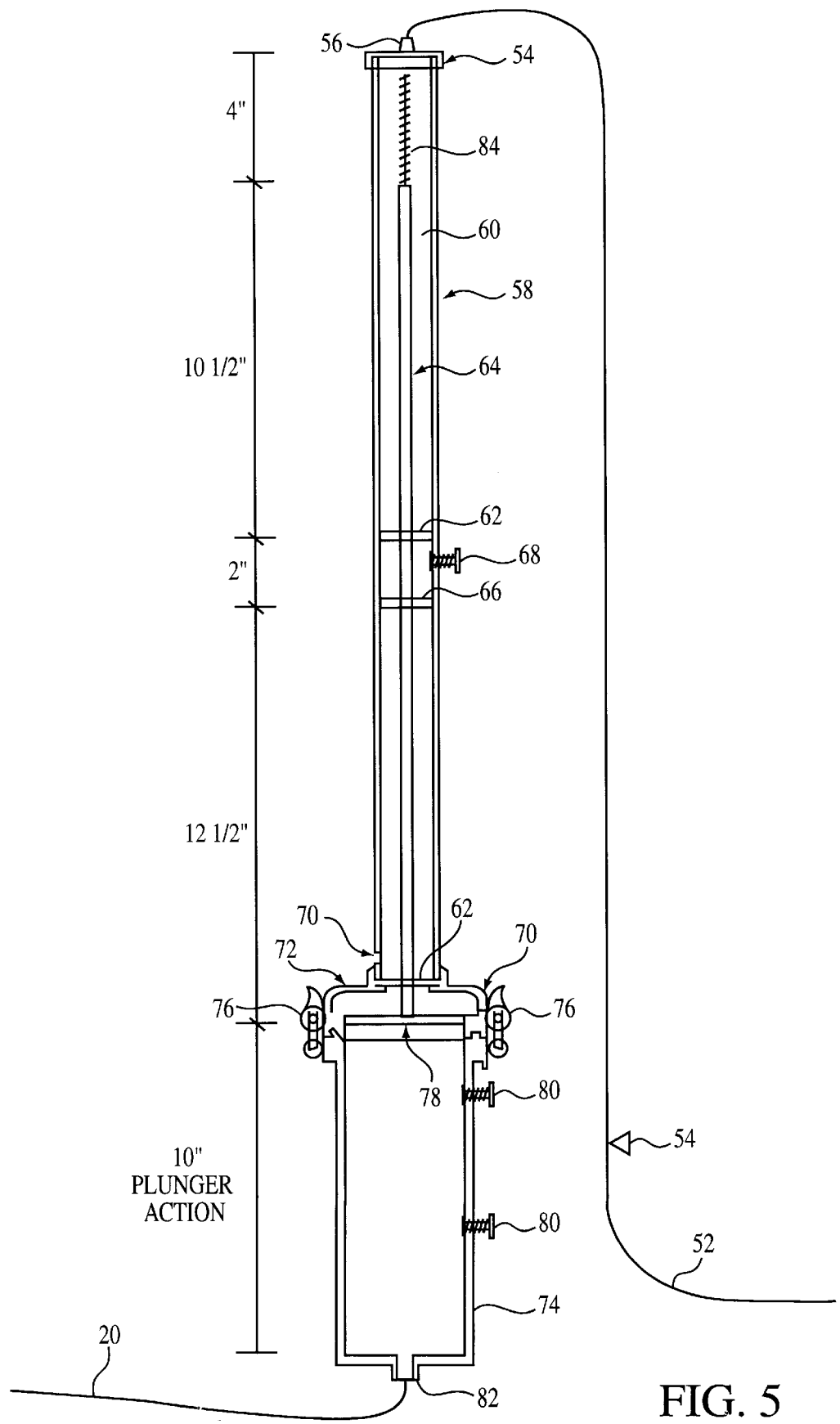
FIG. 5 illustrates an alternative cartridge box according to the present invention.
Figure 7:
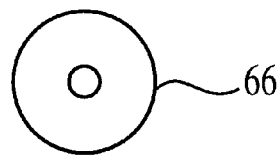
FIG. 7 illustrates a view of a sealed washer of the invention.

FIG. 5 shows an alternative embodiment in which no cartridge 22 is required. The device employs the hand-held gun 40 of FIGS. 3 and 4. A pressurized air hose 52 is connected to an air compressor (not shown). The air pressure in the air hose 52 is regulated using any standard air pressure valve 54. A two inch diameter pipe 58 defines the side walls of a compressed air chamber 60. The pipe 58 can be formed from any suitable material, such as aluminum, stainless steel, composite, and plastic. Aluminum is preferred. Furthermore, the diameter of the pipe 58 is not critical and can be any size as desired. To reduce manufacturing costs, a standard two inch diameter pipe 58 has been used by way of example. A plunger rod 64 is located within the pipe 58. The plunger rod 64 contains a sealed washer 66 which defines a movable lower wall of the compressed air chamber 60. FIG. 7 illustrates a view of the sealed washer 66. The sealed washer 66 provides an air seal with the inside walls of the pipe 58 and can slide along the inside walls of the pipe 58. A cap 59 defines an upper wall of the compressed air chamber 60. The cap 59 can be secured to the pipe 58 using any suitable securing device, such by screw threads, bolts, clamps and camlocks. An air inlet 56 is provided on the cap 59, or alternatively on any portion of the pipe 58 within the minimum size of the of compressed air chamber 60. For the device shown in FIG. 5, the minimum size of the compressed air chamber 60 is defined by the minimum distance between the cap 59 and the sealed washer 66. The air hose 52 is connected to the air inlet 56 to supply air pressure to the compressed air chamber 60. As the air pressure is increased in the compressed air chamber 60, air pressure forces the sealed washer 66 downward and away from the cap 59 which forces the plunger rod 64 downward.

Figure 6:
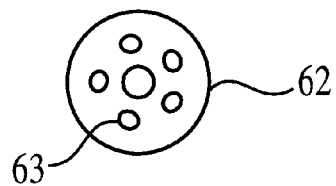
FIG. 6 illustrates a view of a guide washer of the invention having air passages.
Figure 8:
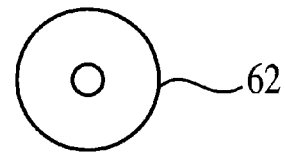
FIG. 8 illustrates a view of a sealed guide washer of the invention.
Figure 9:
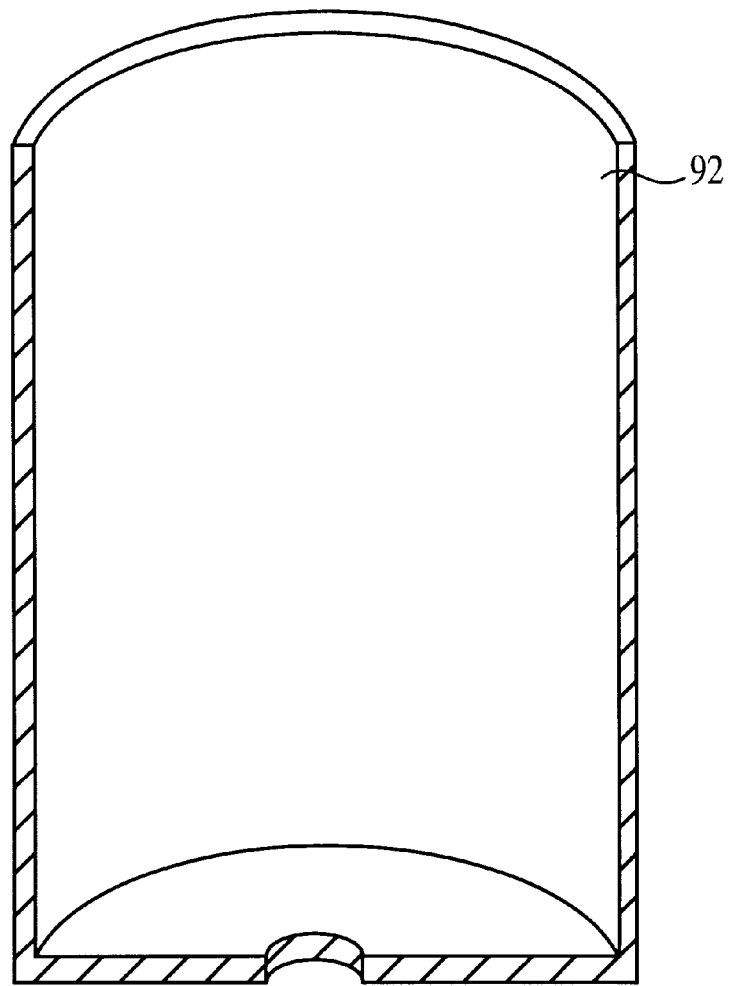
FIG. 9 illustrates a view of a cartridge.

Optional guide washers 62 are located within the pipe 58 to maintain the location of the plunger rod 64 with respect to the side walls of the pipe 58. As shown in FIGS. 6 and 8, there are two types of guide washers 62. FIG. 6 illustrates a guide washer 62 having air passages 63. The plunger rod 64 glides through the center hole in the guide washer 62. FIG. 8 illustrates a sealed guide washer 62 having no air passages. Preferably, the guide washer shown in FIG. 5 closer to the container top 72 is a sealed guide washer 62 as shown in FIG. 8, and the guide washer 62 closer to the cap 59 is a guide washer 62 having air passages 63 as shown in FIG. 6. The compressed air chamber 60 is preferably provided with an air valve 68 for releasing the air pressure in the compressed air chamber 60 when desired. The pipe 58 should be provided with an air vent 70 which is located in a portion of the pipe 58 outside of the compressed air chamber 60, so that air pressure is not built up within the pipe 58 when the sealed washer 66 moves.

The pipe 58 is connected to a top cover 72 of a container 74 for containing the desired pastry dough, frosting or icing. The top cover 72 is removably mounted to the container 74 using cam locks 76. Any suitable securing device, such as bolts, screw threads, cam locks and clamps, can be used to secure the top cover 72 to the container 74. The plunger rod 64 extends down through the top cover 72 and into the container 74. A plunger 78 is mounted on the bottom of the plunger rod 64. The plunger 78 is constructed to provide a seal with the inside walls of the container 74 and slide along the inside walls of the container 74. The container 74 is provided with air valves 80 to remove air from the container 74 as desired. An outlet 82 is located at a bottom of the container 74. The outlet 82 is connected to a conduit 20, which is connected to the hand-held gun 40 in the same manner as described above.

The plunger rod 64 is preferably provided with a spring 84 which biases the plunger rod 64 in a direction away from the container 74. In this manner, when the air pressure is removed from the compressed air chamber 60 using the valve 68, the plunger 78 retracts from the bottom of the container 74 towards the top cover 72.

The operation of the device will now be described. First the air pressure in the compressed air chamber 60 is relieved by closing the valve 54 and opening the valve 68. When the pressure is relieved in the compresses air chamber 60, the container 74 can be separated from the container top 72. The container 74 can be filled with the desired pastry dough, icing or frosting and then attached to the container top 72. Air pressure can be applied to the compressed air chamber 60 by opening the valve 54 and closing the valve 68. Sufficient air pressure should be applied to the compressed air chamber 60 to force the plunger 78 down into contact with the pastry dough, icing or frosting in the container 74. Air caught between the plunger 78 and the top surface of the pastry dough, icing or frosting can be relieved through the valves 80. Preferably, most of the air caught between the plunger 78 and the top surface of the pastry dough, icing or frosting is removed prior to operation of the device. However, the device can be used with air present in the container 74.

Alternatively, a cartridge (not shown) containing the desired pastry dough, icing or frosting can be inserted into the open container 74. The cartridge can be similar to the cartridge 22, in that a cartridge plunger (not shown) is inserted into the cartridge after the desired pastry dough, icing or frosting is inserted. If the cartridge is used, a different plunger 78 will have to be attached to the bottom of the plunger rod 64 because the inside diameter of the cartridge will be less than the inside diameter of the container 74. The plunger 78 can be sized to contact a cartridge plunger in the cartridge or alternatively, the plunger 78 can be sized to seal with in the inside surface of the cartridge such that no cartridge plunger is required. When pressure is applied to the plunger 78 and the hand-held gun valve 43 is open, the plunger 78 forces pastry dough, icing or frosting out of the cartridge, through the outlet 82 and hose 20, into the hand-held gun 40, and out of the interchangeable head 46. The cartridges can be purchased containing the desired pastry dough, icing or frosting, or the desired pastry dough, icing or frosting can be formulated and loaded into the cartridges.

In general, the greater the air pressure against the plunger 78, the greater the speed at which the pastry dough, icing or frosting will travel out of the container 74 through the hose 20, and out of the hand-held gun 40 when the trigger 42 is pulled. Therefore, by varying the amount of air pressure against the plunger 78 using the valve 54, the speed of the pastry dough, icing or frosting being applied can be varied.

Multiple apparatus as shown in FIG. 5 can be used and connected to the hand-held gun 40 using multiple hoses 20. When multiple apparatus are used, the pressure can be shut off and on to each apparatus independently using the associated valve 54 to easily change between different types of pastry dough, icing or frosting being applied using the hand-held gun 40. The pressure can also be adjusted among the different apparatus to compensate for differences in viscosity. Higher viscosities usually require higher pressure to provide a desired level of speed through the hand-held gun 40. The device is suitable for high viscosity materials such as pastry dough, frosting and icing, which do not flow fast or can be sprayed like a liquid. Liquid materials, such as glazes and inks are unsuitable for use in the device described herein. Furthermore, such liquid materials require a spraying device which is very different from the device described herein.

While the claimed invention has been described in detail and with reference to specific embodiments thereof, it will be apparent to one of ordinary skill in the art that various changes and modifications can be made to the claimed invention without departing from the spirit and scope thereof.

I claim:

1. A device for dispensing frosting, icing or pastry dough comprising:
   a tube defining side walls of a compressed air chamber;
   a cap constructed and arranged to seal an end of said tube and define a top of said compressed air chamber;
   a plunger rod disposed within said tube;
   a sealing washer connected to said plunger rod and being constructed and arranged to provide an air seal with an inside surface of said tube and to slide along said inside surface, said sealing washer defining a lower wall of said compressed air chamber;
   an air inlet in said cap or said tube located to allow air into said compressed air chamber;
   valve structure associated with said air inlet for controlling the air pressure in said compressed air chamber;
   a container lid connected to a lower portion of said tube, said plunger rod extending through said container lid;
   a plunger operatively associated with an end of said plunger rod on a side of said container lid opposite said tube;
   a container body having an opening that seals with said container lid and a container outlet in a portion opposite said opening;
   a hand-held gun having a gun valve for dispensing pastry dough, icing or frosting;
   a hose connecting said container outlet to said gun valve;
   a nozzle comprising a head having a shaped opening, said nozzle being connected to said gun; and
   a finger trigger on said hand-held gun connected to said gun valve whereby when pastry dough, frosting or icing is disposed in said container body and said finger trigger is activated said gun valve opens allowing air in said compressed air chamber exerted on said sealing washer to move said plunger and allowing the flow of pastry dough, icing or frosting through said hand-held gun, said nozzle and out of said shaped opening in said head, wherein surfaces of said device which come in contact with pastry dough, icing or frosting are suitable for contact with pastry dough, icing or frosting.

2. A device according to claim 1, herein said plunger is constructed and arranged to seal with an inner surface of said container.

3. A device according to claim 1, wherein said plunger is constructed and arranged to seal with an inner surface of a cartridge contained in said container.

4. A device according to claim 1, wherein said plunger is constructed and arranged to contact a cartridge plunger in a cartridge contained in said container.

5. A device according to claim 1, further comprising at least one guide washer constructed and arranged to maintain a location of said plunger rod with respect to said inner surface of said tube.

6. A device according to claim 1, wherein said head is interchangeable.

7. A method of applying pastry dough, icing or frosting comprising:
   loading pastry dough, icing or frosting into a container body of a device comprising:
   a tube defining side walls of a compressed air chamber;
   a cap constructed and arranged to seal an end of said tube and define a top of said compressed air chamber;
   a plunger rod disposed within said tube;
   a sealing washer connected to said plunger rod and being constructed and arranged to provide an air seal with an inside surface of said tube and slide along said inside surface, said sealing washer defining a lower wall of said compressed air chamber;
   an air inlet in said cap or said tube located to allow air into said compressed air chamber;
   valve structure associated with said air inlet for controlling the air pressure in said compressed air chamber;
   a container lid connected to a lower portion of said tube, said plunger rod extending through said container lid;
   a plunger connected on an end of said plunger rod on a side of said container lid opposite said tube;
   said container body having an opening that seals with said container lid and a container outlet in a portion opposite said opening;
   a hand-held gun for dispensing pastry dough, icing or frosting;
   a hose connecting said container outlet to a gun valve in said hand-held gun; and
   a finger trigger on said hand-held gun connected to said gun valve whereby when said finger trigger is activated said gun valve opens allowing the flow of pastry, icing or frosting through said hand-held gun;
   connecting said container body to said container lid;
   adjusting the air pressure in said compressed air chamber to a level sufficient to force said pastry dough, icing or frosting through said container outlet, though said hose and to said hand-held gun; and
   applying pressure to said finger trigger to cause flow of said pastry dough, icing or frosting through said container outlet, through said hose and through said hand-held gun.

8. A method according to claim 7, wherein said pasty dough, icing or frosting flows through a shaped head on said gun.

9. A method according to claim 8, wherein said shaped head is interchangeable.

10. A method of applying pastry dough, icing or frosting comprising:
    loading a cartridge containing pastry dough, icing or frosting into a container body of a device comprising:
    a tube defining side walls of a compressed air chamber;
    a cap constructed and arranged to seal an end of said tube and define a top of said compressed air chamber;
    a plunger rod disposed within said tube;
    a sealing washer connected to said plunger rod and being constructed and arranged to provide an air seal with an inside surface of said tube and slide along said inside surface, said sealing washer defining a lower wall of said compressed air chamber;
    an air inlet in said cap or said tube located to allow air into said compressed air chamber;
    valve structure associated with said air inlet for controlling the air pressure in said compressed air chamber;
    a container lid connected to a lower portion of said tube, said plunger rod extending through said container lid;
    a plunger connected on an end of said plunger rod on a side of said container lid opposite said tube;
    said container body having an opening that seals with said container lid and a container outlet in a portion opposite said opening;
    a hand-held gun for dispensing pastry dough, icing or frosting;

a hose connecting said container outlet to a gun valve in said hand-held gun; and a finger trigger on said hand-held gun connected to said gun valve whereby when said finger trigger is activated said gun valve opens allowing the flow of pastry, icing or frosting through said hand-held gun;

connecting said container body to said container lid;

adjusting the air pressure in said compressed air chamber to a level sufficient to force said pastry dough, icing or frosting through said container outlet, though said hose and to said hand-held gun; and applying pressure to said finger trigger to cause flow of said pastry dough, icing or frosting through said container outlet, through said hose and through said hand-held gun.

11. A method according to claim 10, wherein said pasty dough, icing or frosting flows through a shaped head on said gun.

12. A method according to claim 11, wherein said shaped head is interchangeable.

* * * * *